US010158824B2

United States Patent
Hashimoto

(10) Patent No.: US 10,158,824 B2
(45) Date of Patent: Dec. 18, 2018

(54) IMAGING APPARATUS, ELECTRONIC DEVICE AND IMAGING SYSTEM

(71) Applicant: Panasonic Intellectual Property Management Co., Ltd., Osaka (JP)

(72) Inventor: Shingo Hashimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/637,356

(22) Filed: Jun. 29, 2017

(65) Prior Publication Data

US 2017/0302878 A1 Oct. 19, 2017

Related U.S. Application Data

(63) Continuation of application No. PCT/JP2016/004594, filed on Oct. 14, 2016.

(30) Foreign Application Priority Data

Dec. 11, 2015 (JP) .................................. 2015-242076

(51) Int. Cl.
*H04N 1/04* (2006.01)
*H04N 5/765* (2006.01)
(Continued)

(52) U.S. Cl.
CPC .............. *H04N 5/765* (2013.01); *H04N 5/232* (2013.01); *H04N 5/23277* (2013.01);
(Continued)

(58) Field of Classification Search
CPC ..... H04N 5/765; H04N 5/23277; H04N 5/232
(Continued)

(56) References Cited

U.S. PATENT DOCUMENTS

2012/0242853 A1* 9/2012 Jasinski ............. H04N 5/23232
348/222.1
2013/0107062 A1* 5/2013 Okazaki ............. H04N 5/23203
348/207.1
(Continued)

FOREIGN PATENT DOCUMENTS

JP 2007-173963 7/2007
JP 2014-107775 6/2014
(Continued)

OTHER PUBLICATIONS

International Search Report dated Dec. 27, 2016 in International (PCT) Application No. PCT/JP2016/004594.
(Continued)

*Primary Examiner* — Houshang Safaipour
(74) *Attorney, Agent, or Firm* — Wenderoth, Lind & Ponack, L.L.P.

(57) ABSTRACT

An imaging apparatus includes an image capturing unit configured to capture a subject to generate image data, a communication unit configured to receive image data from a plurality of electronic devices, and a controller configured to combine an image indicated by the image data received from an electronic device registered in advance as a target device for a predetermined function with an image indicated by the image data generated by the image capturing unit. The controller registers the electronic devices as the target device, the number of registered electronic devices being equal to or less than a first predetermined number. The controller limits the number of the electronic devices from which the image data is received to a second predetermined number or less, with the second predetermined number being less than the first predetermined number.

5 Claims, 12 Drawing Sheets

(51) Int. Cl.
 *H04N 5/232*   (2006.01)
 *H04N 5/247*   (2006.01)
 *H04N 5/262*   (2006.01)
 *H04N 5/77*   (2006.01)
 *H04N 9/82*   (2006.01)
 *H04N 19/42*   (2014.01)
 *H04N 7/22*   (2006.01)

(52) U.S. Cl.
 CPC ......... *H04N 5/23293* (2013.01); *H04N 5/247* (2013.01); *H04N 5/2621* (2013.01); *H04N 5/2624* (2013.01); *H04N 5/77* (2013.01); *H04N 9/8227* (2013.01); *H04N 7/22* (2013.01); *H04N 19/42* (2014.11)

(58) Field of Classification Search
 USPC .................................................. 358/471, 474
 See application file for complete search history.

(56) References Cited

U.S. PATENT DOCUMENTS

2015/0296118 A1* 10/2015 Okazaki ................... H04B 5/02
                  348/211.99
2017/0359552 A1* 12/2017 Kobayashi ............. H04N 5/781

FOREIGN PATENT DOCUMENTS

JP   2014-131224   7/2014
JP   2015-146561   8/2015

OTHER PUBLICATIONS

International Preliminary Report on Patentability dated Jun. 21, 2018 in connection with International Application No. PCT/JP2016/004594.

* cited by examiner

Fig. 7

| SUBCAMERA | DEVICE NAME |
|---|---|
| SUBCAMERA1 | smart_phone_a |
| SUBCAMERA2 | smart_phone_b |
| SUBCAMERA3 | smart_phone_c |

IMAGING APPARATUS, ELECTRONIC DEVICE AND IMAGING SYSTEM

BACKGROUND

1. Technical Field

The present disclosure relates to an imaging apparatus capable of receiving image data from a plurality of external devices and recording images obtained by combining images indicated by the received image data with images captured by the imaging apparatus.

2. Related Art

Japanese Patent laid-open Publication No. JP2014-107775A discloses an electronic camera that combines electronic images of a plurality of channels. The electronic camera disclosed in the Japanese Patent laid-open Publication No. JP2014-107775A combines a sub electronic image obtained by an obtaining unit with a main electronic image generated by an image capturing unit. In that process, the sub electronic image is adjusted in size to be smaller than the size of the main electronic image and then is combined with the main electronic image. In addition, a sub scene is tried to be detected in which significant changes occur in the sub electronic image. When such a sub scene is detected, the size and combining mode of the sub electronic image representing the detected sub scene are changed, so that the sub electronic image is highlighted. Accordingly, necessary and sufficient information is conveyed to a viewer, and visibility of the combined image is improved.

The Japanese Patent laid-open Publication No. JP2007-173963A discloses an imaging apparatus (camera) capable of multi-angle capturing. The Japanese Patent laid-open Publication No. JP2007-173963A discloses the imaging apparatus (camera) that receives moving image data from another imaging apparatus wirelessly, and combines the moving image data received from the other imaging apparatus to display the combined moving image data on a display unit.

The present disclosure provides an imaging apparatus capable of receiving image data from a plurality of external devices and recording an image obtained by combining an image indicated by the received image data with an image captured by the imaging apparatus of the present disclosure.

SUMMARY

In a first aspect of the present disclosure, an imaging apparatus capable of combining and recording a plurality of images is provided. The imaging apparatus includes an image capturing unit configured to capture a subject to generate image data, a communication unit configured to receive image data from a plurality of electronic devices, and a controller configured to combine an image indicated by the image data received from an electronic device registered in advance as a target device for a predetermined function with an image indicated by the image data generated by the image capturing unit. The controller registers the electronic devices as the target device, with the number of registered electronic devices being equal to or less than a first predetermined number. The controller limits the number of the electronic devices from which the image data is received to a second predetermined number or less, the second predetermined number being less than the first predetermined number.

In a second aspect of the present disclosure, an electronic device for sending image data to the imaging apparatus is disclosed. The electronic device includes a second image capturing unit configured to capture a subject to generate the image data, a second communication unit configured to send the image data generated by the second image capturing unit to the imaging apparatus, and a second controller configured to control sending of the image data to the imaging apparatus. Upon receipt of the permission to transfer the image data from the imaging apparatus, the second controller sends the image data generated by the second image capturing unit to the imaging apparatus.

The present disclosure causes the imaging apparatus to limit the number of external devices from which to receive the image data, thereby reducing degradation in image quality during reproduction of a combined image due to insufficient bandwidth of a communication line.

BRIEF DESCRIPTION OF DRAWINGS

FIG. 7 is a diagram illustrating registration information on the sub camera;

DETAILED DESCRIPTION OF PREFERRED EMBODIMENT

Embodiments will be described in detail below with reference to the drawings as appropriate. However, a description more detailed than necessary may be omitted. For example, a detailed description of already well-known matters and a repeated description regarding substantially identical components may be omitted. This is intended to avoid making the following description unnecessarily redundant and to make it easier for a person skilled in the art to understand the embodiments. It is to be noted that the inventers provide the accompanying drawings and the following description in order for a person skilled in the art to fully understand the present disclosure, and do not intend to limit the subject described in the appended claims.

First Embodiment

Figure 1:
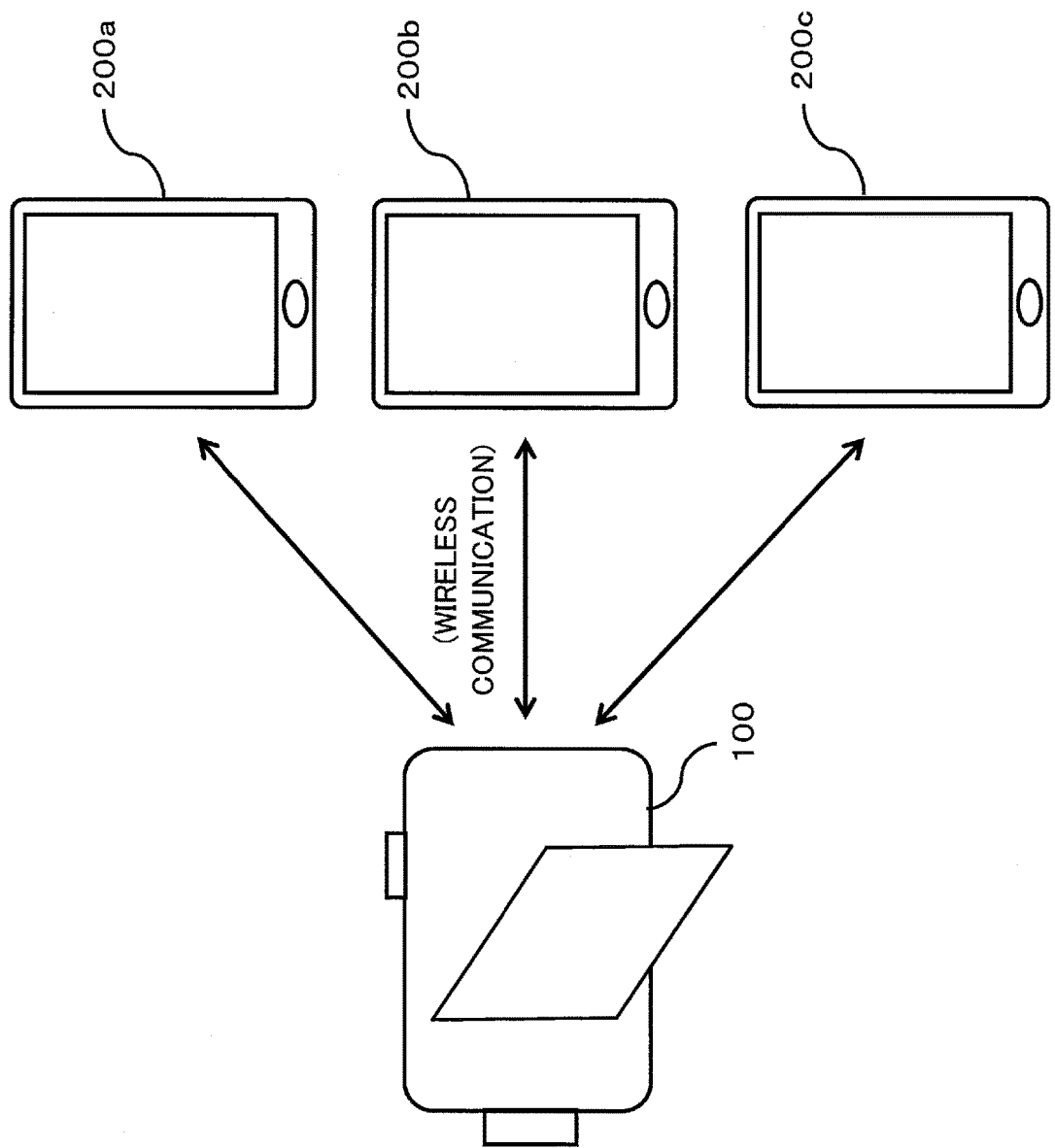
FIG. 1 is a diagram illustrating a configuration of an imaging system including a video camera and smartphones.

FIG. 1 is a diagram illustrating a configuration of an imaging system including a video camera and smartphones according to a first embodiment. A video camera 100 can establish communication with a plurality of smartphones

200a to 200c, and receive image data (moving image data) from the plurality of smartphones 200a to 200c simultaneously.

1. Configurations

The configurations of the video camera 100 and the smartphones 200a to 200c according to the first embodiment will be described below. In the following description, when the smartphones 200a to 200c are described without any distinction, a reference sign "200" is generally used for the smartphones.

1-1. Configuration of Video Camera

Figure 2:
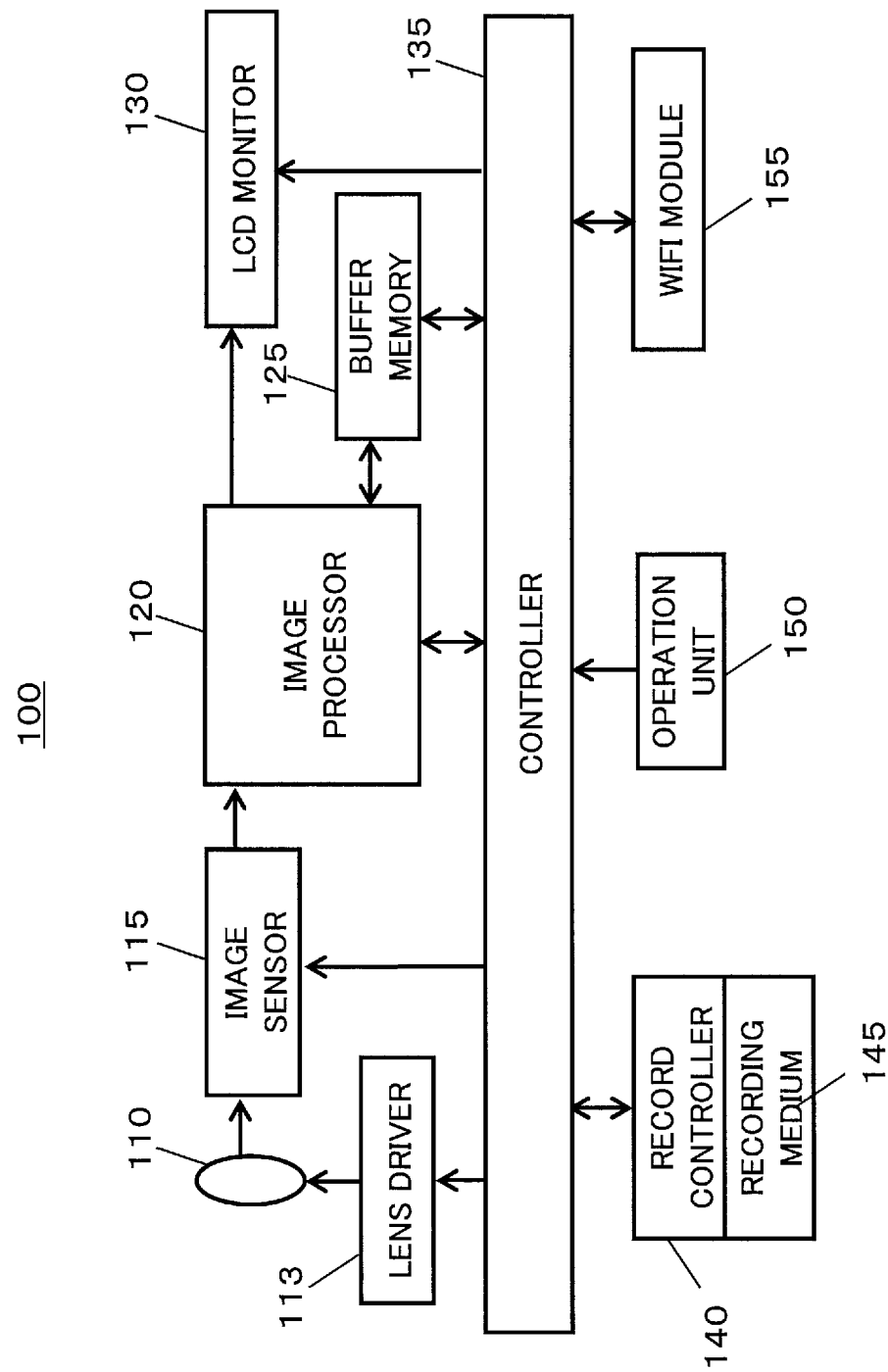
FIG. 2 is an electric configuration diagram of the video camera.

FIG. 2 is an electric configuration diagram of the video camera 100. The video camera 100 captures a subject image formed through an optical system 110 with an image sensor 115. The image sensor 115 generates captured image data (RAW data) based on the captured subject image. An image processor 120 performs various processes on the captured image data generated by capturing to generate image data. A controller 135 records the image data generated by the image processor 120 on a recording medium 145. Furthermore, the controller 135 can display (reproduce), on a liquid crystal display (LCD) monitor 130, the image data recorded on the recording medium 145 in response to an operation of an operation unit 150 made by a user.

The optical system 110 includes a focus lens, a zoom lens, OIS (Optical Image stabilizer for correcting camera shake), a diaphragm, a shutter, and the like. Any lenses included in the optical system 110 may be composed of any number of lenses, or any number of lens groups.

The image sensor 115 is a device that captures the subject image formed through the optical system 110 and generates the captured image data. The image sensor 115 generates the image data (moving image data) at a predetermined frame rate (for example, 30 frames/second). Timing to generate the captured image data and an electronic shutter operation in the image sensor 115 are controlled by the controller 135. The image sensor 115 includes, for example, a CCD image sensor, a CMOS image sensor, or an NMOS image sensor.

The image processor 120 is a circuit that performs various processes on the captured image data output from the image sensor 115 to generate the image data. The image processor 120 performs various processes on the image data read from the recording medium 145 to generate images to be displayed on the LCD monitor 130. The various processes include, but are not limited to, white balance correction, gamma correction, YC conversion process, electronic zoom process, compression process, and expansion process, for example. The image processor 120 may include hardwired electronic circuitry, or may include a microcomputer with programs.

The LCD monitor 130 is provided, for example, on an enclosure attached openably to a side surface of a body of the video camera 100. The LCD monitor 130 displays images based on the image data processed by the image processor 120. As a display device, other monitors such as an organic EL monitor may be used in place of the LCD monitor.

The controller 135 comprehensively controls the operation of the entire video camera 100. The controller 135 includes a CPU or MPU, and achieves functions of the video camera 100 to be described later by performing predetermined programs. Furthermore, the controller 135 may be integrated into a single semiconductor chip together with the image processor 120 and other components. Furthermore, the controller 135 has a ROM (not illustrated) therein. The ROM stores a SSID (service set identifier) and a WEP (wired equivalent privacy) key necessary for establishing WiFi communication with other communication devices. The controller 135 can read the SSID and WEP key from the ROM as necessary. The ROM stores programs related to autofocus control (AF control) and communication control, and further a program for overall control of the operation of the video camera 100.

A buffer memory 125 is a recording medium that functions as a work memory for the image processor 120 and the controller 135. The buffer memory 125 is implemented by a device such as a DRAM (dynamic random access memory).

A recording controller 140 is a device for recording the image data to the recording medium 145 and reproducing the image data from the recording medium 145. The recording medium 145 is a solid state drive (SSD) containing flash memories therein. The recording medium 145 may include a hard disk (HDD) or a removable memory card instead of the SSD. The recording medium 145 can store data such as the image data generated by the image processor 120.

The operation unit 150 is a user interface that receives an operation made by a user, and includes an operation button, an operation lever, a touch panel, and the like. Upon receipt of the operation made by the user, the operation unit 150 sends the controller 135 of various operation instruction signals.

A WiFi module 155 is a communication module (electronic circuit) that performs communication conforming to the communication standard IEEE 802.11. Via the WiFi module 155, the video camera 100 can communicate with other external devices equipped with WiFi modules (for example, the smartphones 200a to 200c). The video camera 100 may directly communicate with other communication devices via the WiFi module 155, or may communicate via an access point. Here, in place of the WiFi module, a communication module that performs communication conforming to the communication standard 802.15.1, that is, Bluetooth (registered trademark) may be used.

1-2. Configuration of Smartphone

Figure 3:
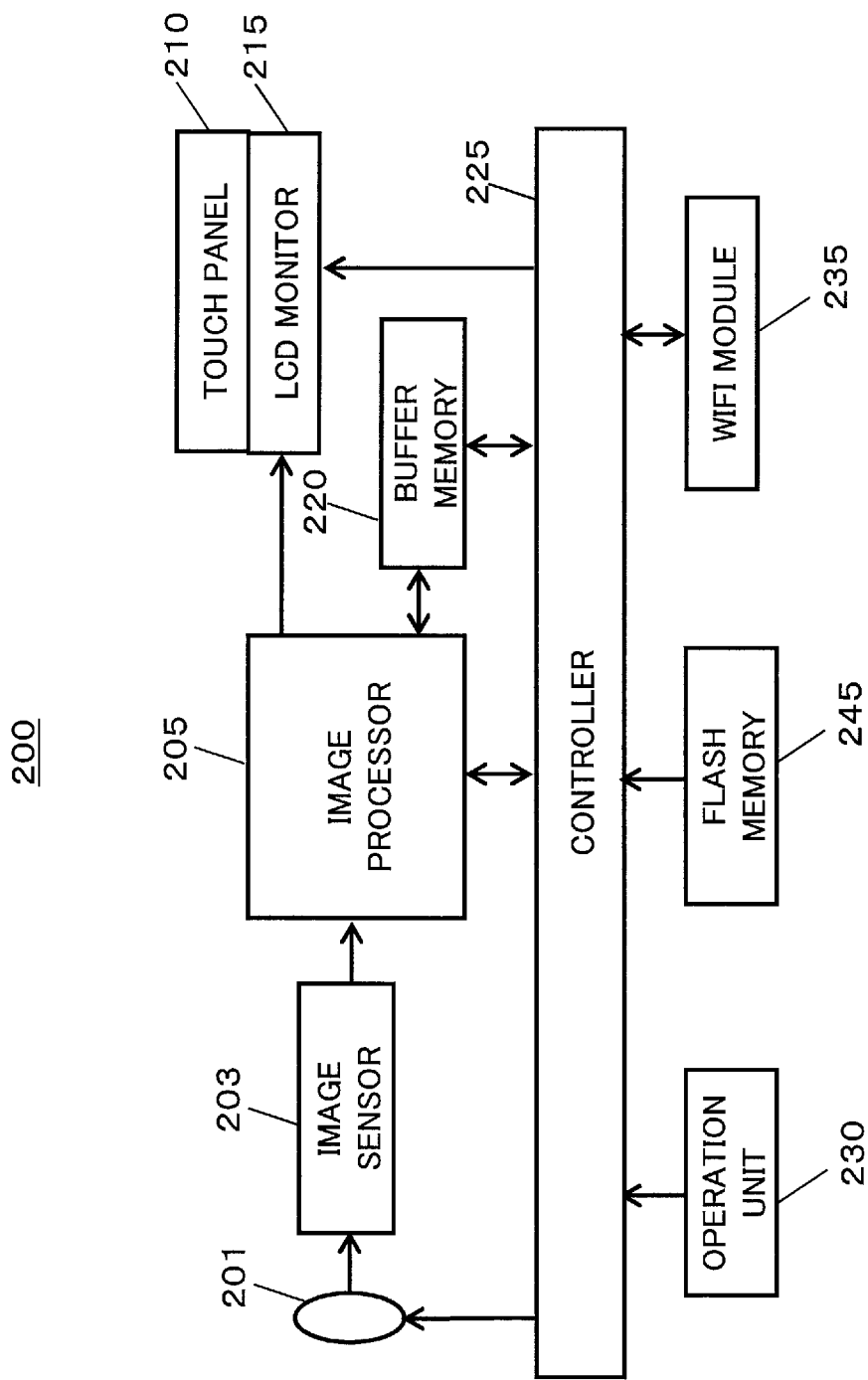
FIG. 3 is an electric configuration diagram of the smartphone.

FIG. 3 is an electric configuration diagram of the smartphone 200. The smartphone 200 generates image data (moving image data) from a subject image received through an optical system 201 with an image sensor 203. The smartphone 200 can communicate with the video camera 100 via a WiFi module 235. The smartphone 200 can send the generated image data to the video camera 100 via the WiFi module 235.

An image processor 205 performs various processes on the image data generated by the image sensor 203, and generates an image (live view image) to be displayed on a liquid crystal display (LCD) monitor 215. Examples of the various processes include, but are not limited to, an expansion process. The image processor 205 may include hardwired electronic circuitry, or may include a microcomputer with programs.

A touch panel 210 is an input device that detects contact of a user's finger or the like and outputs operation information to a controller 225. The touch panel 210 is disposed on a surface of the LCD monitor 215. The touch panel 210 may be of a resistive film type, a capacitive type, or any other types.

The LCD monitor 215 is a display device that displays a screen instructed from the controller 225. Instead of the LCD monitor, other types of display device (for example, an organic EL monitor) may be used.

A buffer memory 220 is a memory that temporarily stores information necessary for the controller 225 to perform various processing operations.

The controller 225 controls the operations of respective units composing the smartphone 200. The controller 225 is electrically connected to the image processor 205, the touch panel 210, the LCD monitor 215, the buffer memory 220, an operation unit 230, the WiFi module 235, and a flash memory 245. The controller 225 includes a CPU or MPU, and executes a predetermined program (hereinafter referred to as "image transfer application") to achieve functions of the smartphone 200 as described later. The image transfer application is stored in the flash memory 245.

The WiFi module 235 is a communication module (circuit) that performs communication conforming to the communication standard IEEE 802.11. Via the WiFi module 235, the smartphone 200 can communicate with other communication devices equipped with WiFi modules. The smartphone 200 may directly communicate with other communication devices via the WiFi module 235 or via an access point. Here, in place of the WiFi module, a communication module that performs communication conforming to the communication standard 802.15.1, that is, Bluetooth (registered trademark) may be used. In other words, it is possible to use, as the communication module, a communication module capable of communication at a relatively high communication bit rate and in a communication area of several meters or more.

The smartphone 200 can communicate with the video camera 100 via the WiFi module 235, and can send image data to the video camera 100 or receive image data from the video camera 100.

The flash memory (hereinafter simply referred to as "memory") 245 stores data such as image data captured by the smartphone 200 and image data transferred from the video camera 100.

The smartphone 200 has a telephone function and an Internet communication function. Furthermore, the smartphone 200 may include a second image capturing unit (sub camera) in addition to a first image capturing unit (main camera) including the optical system 201 and the image sensor 203. In this case, as a multi-wipe function (details will be described later), an image captured by the second image capturing unit may be superimposed on an image captured by the first image capturing unit.

2. Operation 2.1 Multi-wipe Function

The multi-wipe function will be described below. The video camera 100 can use a plurality of external electronic devices as sub cameras. The video camera 100 can receive, from the plurality of electronic devices, images (moving images) captured by the electronic devices, superimposes (combines) the received images on part of a region of an image (moving image) captured by the video camera 100, and displays and records the superimposed image. This function is called "multi-wipe function." In the present embodiment, a smartphones is used as a sub camera.

The video camera 100 can perform WiFi communication with the smartphones 200a to 200c via the WiFi module 155. When performing the multi-wipe function, the video camera 100 receives, from the smartphones 200a to 200c, image data (moving image data) indicating images captured by the smartphones 200a to 200c. The video camera 100 then generates an image by superimposing (combining) the images (moving images) received from the smartphones 200a to 200c on part of the image (moving image) captured by the video camera 100 itself, displays the generated image on the LCD monitor 130, and records the generated image on the recording medium 145 in response to the user operations.

Figure 4:
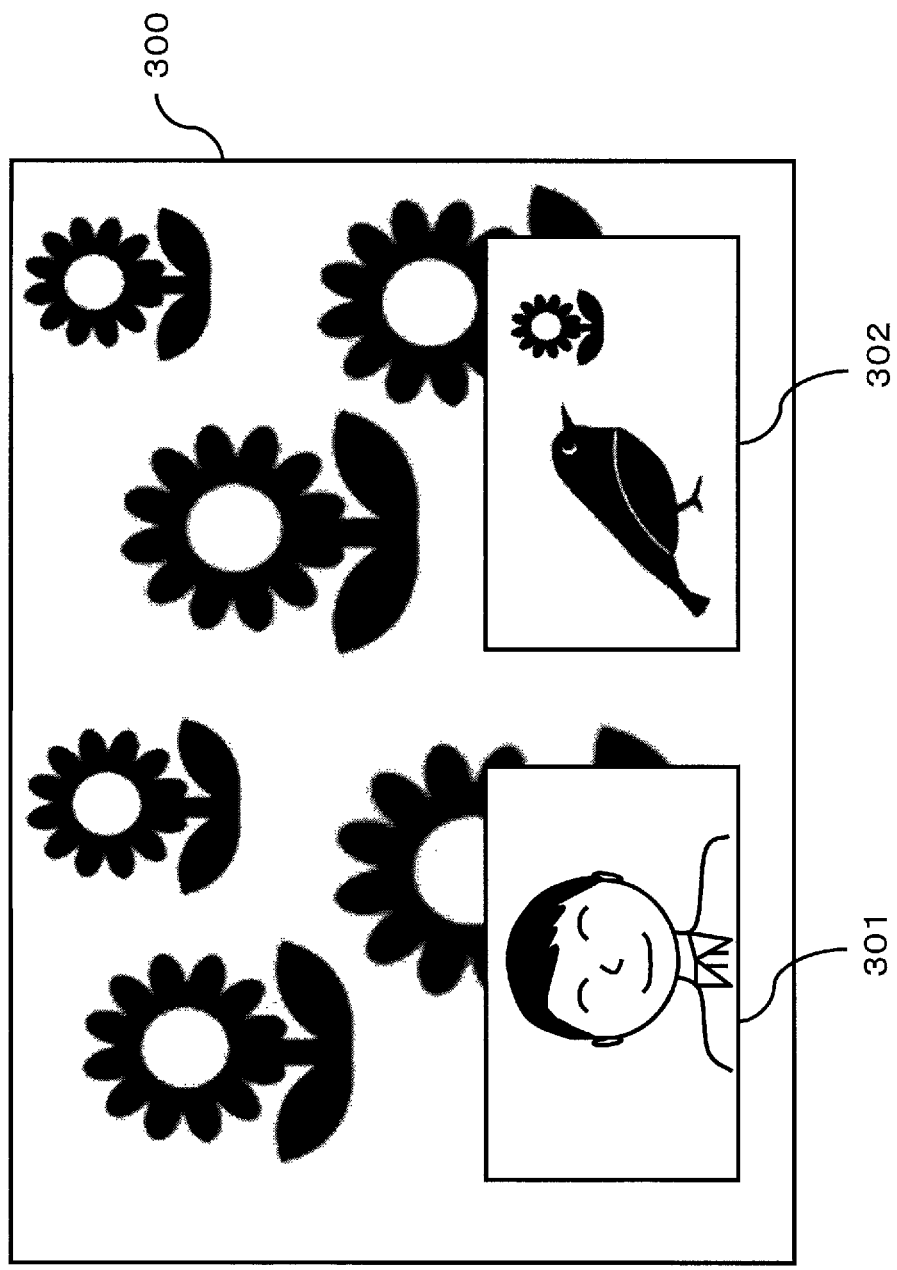
FIG. 4 is a diagram illustrating an example of an image displayed by a multi-wipe function.
Figure 5:
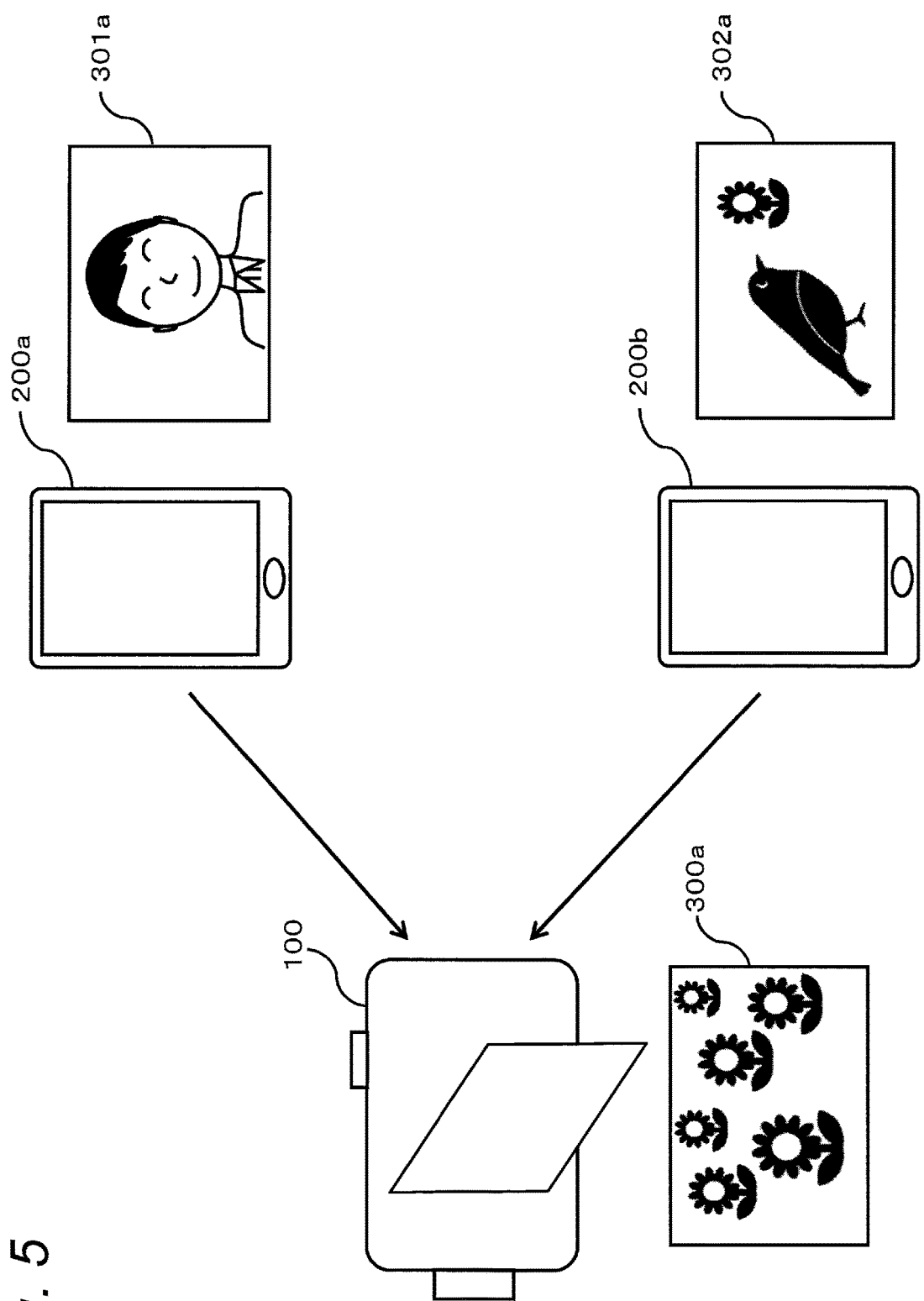
FIG. 5 is a diagram illustrating images captured by the video camera and the smartphones.

FIG. 4 is a diagram illustrating one example of the image to be displayed on the LCD monitor 130 of the video camera 100 due to the multi-wipe function. As illustrated in FIG. 4, images received from the smartphones 200a and 200b are superimposed as wipe images 301 and 302, respectively, on an image 300 captured by the video camera 100 (hereinafter referred to as "main image"). In this case, as illustrated in FIG. 5, the video camera 100 generates image data indicating an image 300a. The smartphone 200a generates an image 301a, whereas the smartphone 200b generates an image 302a. The video camera 100 receives image data indicating the images 301a and 302a from the smartphones 200a and 200b, respectively. The video camera 100 then superimposes, as the wipe images, the images 301a and 302a indicated by the image data respectively received from the smartphones 200a and 200b on the image 300a captured by the video camera 100. Accordingly, a combined image illustrated in FIG. 4 is generated in which the wipe images 301 and 302 are superimposed on the main image 300. In a state illustrated in FIG. 4, when the user performs a predetermined operation for instructing the video camera 100 to start recording moving images, a moving image is recorded with the wipe images 301 and 302 superimposed on the main image 300.

Figure 6:
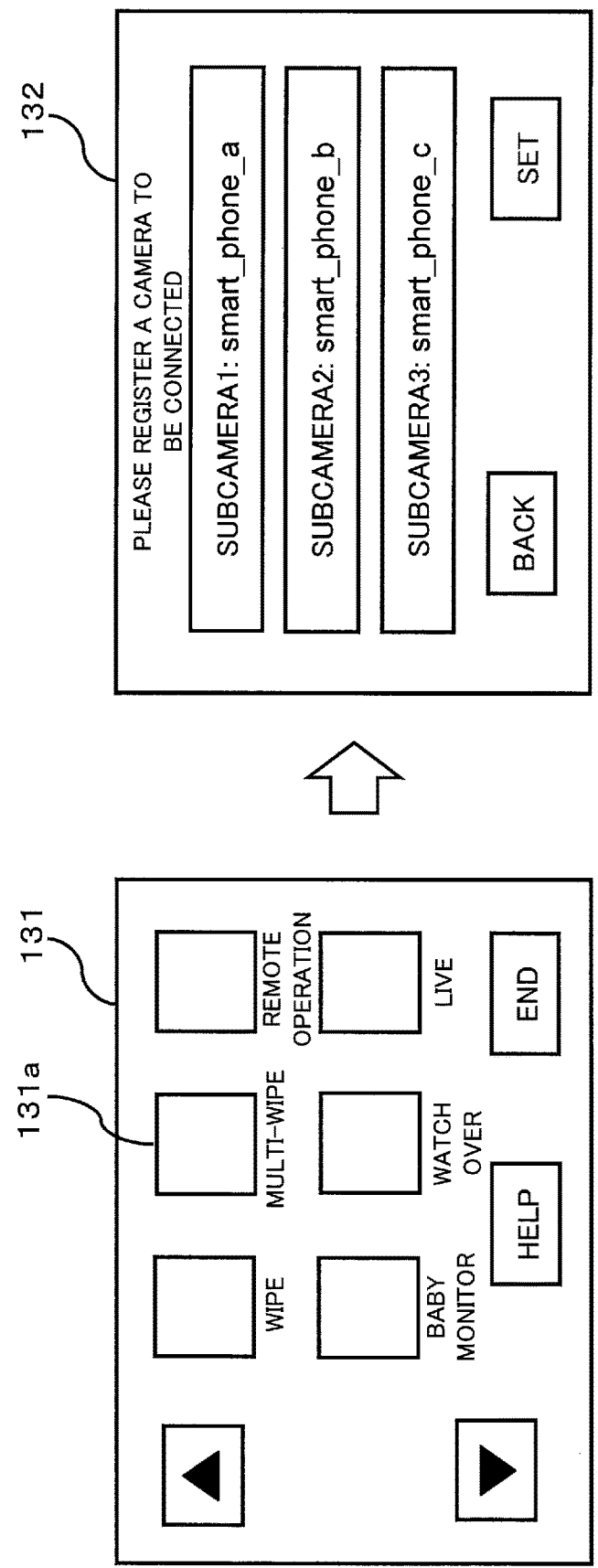
FIG. 6 is a diagram illustrating a registration operation of the sub camera.

The video camera 100 of the present embodiment has in advance a registration of external devices to be used as sub cameras for the multi-wipe function. FIG. 6 is a diagram illustrating an operation of such a registration. In FIG. 6, a screen 131 is one example of a setting screen to be displayed on the LCD monitor 130 of the video camera 100. Performing a predetermined operation in the operation unit 150 of the video camera 100 causes the setting screen 131 to be displayed. A plurality of icons for setting various functions are displayed on the setting screen 131. When the user selects a multi-wipe function setting icon 131a on the setting screen 131, a registration screen 132 is displayed. An user can register external devices to be used as a sub camera for the multi-wipe function, on the registration screen 132. The user enters a device name of the external device to be registered, on the registration screen 132. When the registration on the registration screen 132 is completed, sub camera registration information is generated (or updated). FIG. 7 is a diagram illustrating a data structure of the sub camera registration information. The sub camera registration information manages the device name of the external device to be registered as sub camera. The sub camera registration information is stored on the recording medium 145 in the video camera 100. In the examples of FIG. 6 and FIG. 7, three smartphones 200a, 200b, and 200c (device names: smart_phone_a, smart_phone_b, smart_phone_c) have been registered.

In the video camera 100 of the present embodiment, an upper limit (hereinafter referred to as "first predetermined number") of the number of devices that can be registered as a sub camera for the multi-wipe function is set. In the present embodiment, the first predetermined number is set to "3" as one example. That is, the video camera 100 can register up to three external devices, as a sub camera.

In addition, in the multi-wipe function, an upper limit of the number of external devices (sub cameras) that are permitted to transfer image data to the video camera 100 (hereinafter referred to as "second predetermined number") is set in the video camera 100. The second predetermined number is set to a value smaller than the first predetermined number, and in the present embodiment, the second predetermined number is set to "2" as one example. As such, the video camera 100 is configured so that only up to two smartphones are permitted to transfer images to the video camera 100 simultaneously. This is because if the video camera 100 receives image data from three smartphones simultaneously, a communication band will become insufficient, and when the video camera 100 reproduces the received image data, frame dropping or delay will occur, leading to degradation in image quality. The present embodiment limits the number of external devices that may transfer image data (sub cameras) to a number less than the number of devices that can be registered as a sub camera, so that the communication band for transferring image data can be secured and preventing degradation in image quality during reproduction of the received image data.

2-2. Communication Operation between Video Camera and Smartphone

Communication operations between the video camera 100 and the smartphone 200 related to the multi-wipe function will be described with reference to FIGS. 8 to 11.

Figure 8:
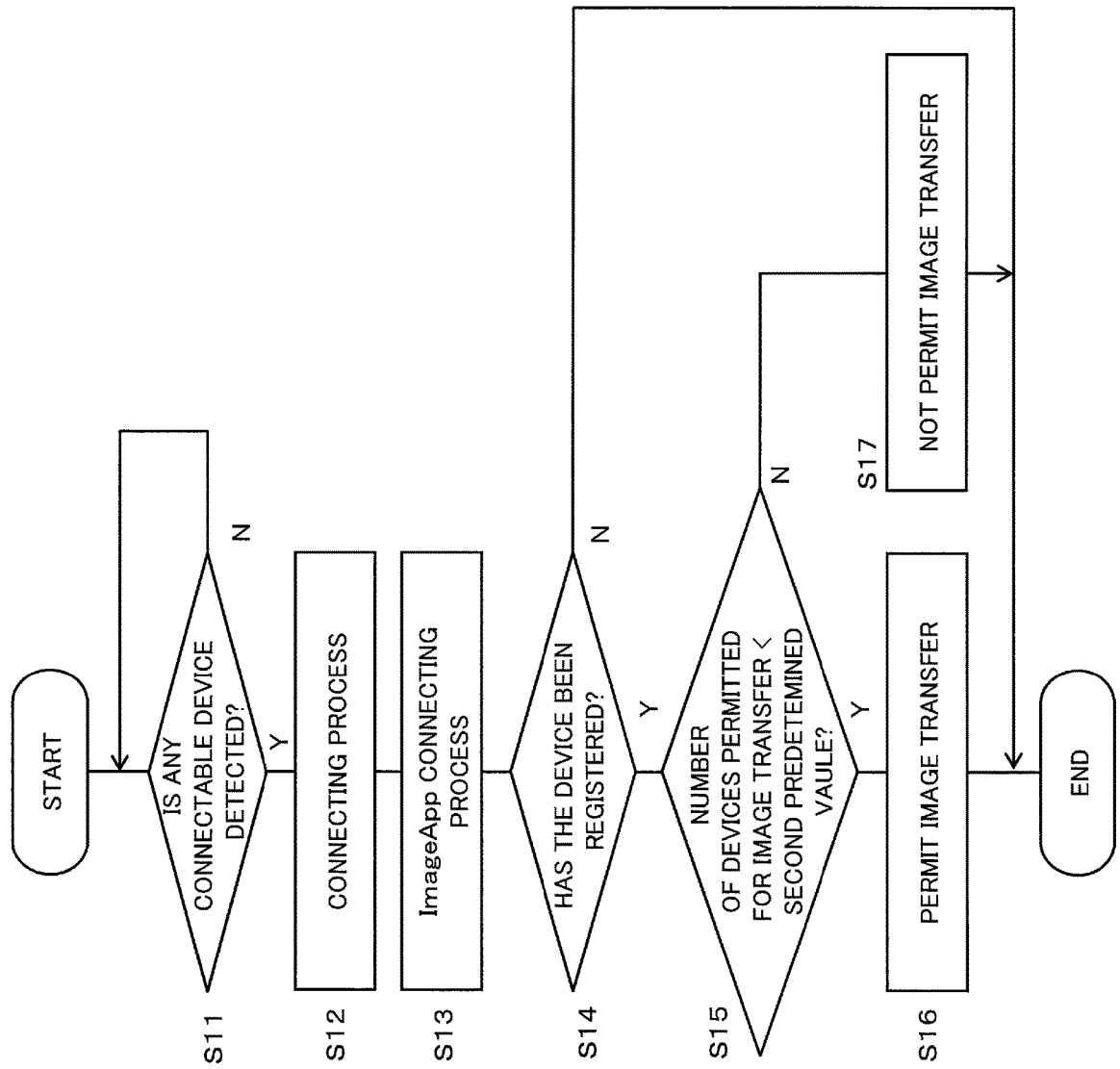
FIG. 8 is a flowchart illustrating a process regarding an image transfer operation in the video camera.

FIG. 8 is a flowchart illustrating the operation regarding the multi-wipe function in the video camera 100.

Upon detection of the smartphone 200 connectable by WiFi communication (S11), the controller 135 of the video camera 100 performs a connecting process (that is, establishment of WiFi communication) to the detected smartphone in accordance with the WiFi standard (S12). For this purpose, the video camera 100 holds connection information (such as SSID, and WEP key) necessary for connection by WiFi communication for the smartphone 200 to be connected.

When the connecting process is completed, the controller 135 activates an application specially designed for transferring image data from the smartphone 200 to the video camera 100 (hereinafter referred to as "ImageApp") and performs an ImageApp connecting process (S13). In the ImageApp connecting process, the controller 135 determines whether the connected smartphone 200 has been registered in the sub camera registration information (refer to FIG. 7) (S14).

When the connected smartphone 200 has not been registered in the sub camera registration information (No in S14), the ImageApp connection process is not completed and ends (an error response is returned to the smartphone 200).

On the other hand, when the connected smartphone 200 has been registered in the sub camera registration information (Yes in S14), the controller 135 determines whether the number of smartphones 200 (sub cameras) that have already been permitted to transfer images to the video camera 100 is less than the second predetermined number ("2" in this example) (S15). Here, the second predetermined number is the upper limit of the number of external devices permitted to transfer image data. The controller 135 counts smartphones 200 permitted to transfer images and manages the number (count) of them.

When the number of smartphones 200 (sub cameras) already permitted to transfer images is equal to or greater than the second predetermined number ("2" in this example) (No in S15), the controller 135 sets the connected smartphone 200 not permitted to transfer images (S17). Then, upon receipt of a request for camera information from the smartphone 200, the controller 135 sends the camera information including information indicating no permission for image transfer (S17). The camera information includes various pieces of information indicating a state of the video camera 100, in addition to the information indicating no permission for image transfer. For example, the camera information includes information indicating whether the video camera 100 is recording, and information indicating whether the wipe function is on (active).

On the other hand, when the number of smartphones 200 (sub cameras) already permitted to transfer images is less than the second predetermined number (Yes in S15), the controller 135 sets the smartphone 200 permitted to transfer images (S16). At this time, the controller 135 increments by one a counter indicating the number of smartphones permitted to transfer images. Upon receipt of the request for the camera information from the smartphone 200, the controller 135 sends the camera information including information indicating permission for image transfer (S16). Upon receipt of the information from the video camera 100 indicating permission for image transfer, the smartphone 200 starts transfer of the image data indicating images captured by the smartphone 200 to the video camera 100.

As described above, the video camera 100 permits up to three smartphones 200 to be connected with the video camera 100, but the video camera 100 permits only up to two smartphones 200 to transfer image data. Such control can suppress insufficiency of the communication band and reduce degradation in image quality of the image data to be recorded (or displayed) while performing the multi-wipe function.

Figure 9:
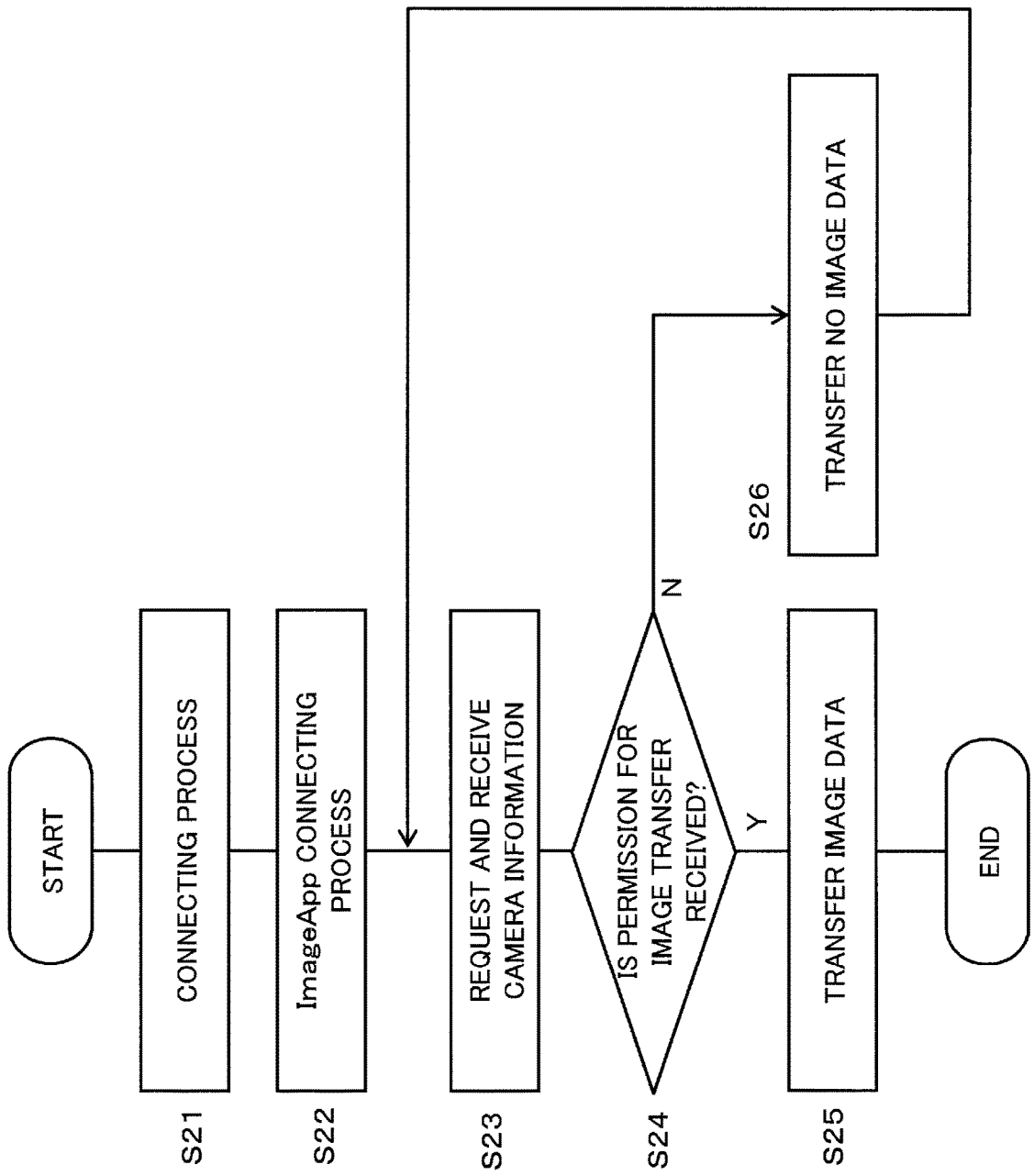
FIG. 9 is a flowchart illustrating a process regarding an image transfer operation in the smartphone.

FIG. 9 is a flowchart illustrating an operation regarding the multi-wipe function in the smartphone 200. The processing operation illustrated in FIG. 9 is implemented by the controller 225 of the smartphone 200 performing the image transfer application.

The controller 225 of the smartphone 200 performs a connection process of WiFi communication with the video camera 100 (refer to step S12 of FIG. 8) (S21). The controller 225 activates the ImageApp and performs the ImageApp connecting process (refer to step S13 of FIG. 8) (S22). The controller 225 requests and receives the camera information from the video camera 100 (S23). Upon receipt of the request for the camera information from the smartphone 200, the video camera 100 incorporates the information indicating permission/no permission for image transfer into the camera information, and sends the camera information to the smartphone 200 (refer to steps S16 and S17 of FIG. 8). The controller 225 checks the information indicating permission/no permission for image transfer included in the received camera information (S24).

Upon receipt of the information indicating permission for image transfer in the camera information (Yes in S24), the controller 225 sends the image data of the image captured by the smartphone 200 to the video camera 100 via the WiFi module 235.

On the other hand, when the information indicating permission for image transfer in the camera information is not received, that is, when the information indicating no permission for image transfer is received (No in S24), the controller 225 does not send the image data to the video camera 100 (S26), returns to step S23 to request the video camera 100 again to send the camera information. Upon receipt of the request for the camera information from the smartphone 200, the video camera 100 sends the camera information to the smartphone 200. At that time, the controller 135 of the video camera 100 newly sets information indicating permission/no permission for image transfer based on a latest status regarding image transfer permission, incorporates the newly set information into the camera information, and sends the camera information to the smartphone 200. For example, when the controller 135 of the video camera 100 fails to receive the image data from the smartphone 200 permitted to transfer images for a predetermined time period, the controller 135 disconnects connection to the smartphone 200. At the same time, the controller 135 decrements by one the counter indicating the number of smartphones permitted to transfer images.

Subsequently, upon receipt of the camera information (S23), the controller 225 of the smartphone 200 determines whether to transfer the image data based on the information indicating permission/no permission for image transfer (S24 to S26).

That is, the controller 225 of the smartphone 200 periodically requests the camera information from the video camera 100 until receiving, from the video camera 100, the information indicating permission for image transfer. With this control, the controller 225 of the smartphone 200 determines whether image transfer is permitted to itself (the smartphone 200). When the smartphone 200 is permitted to transfer the image, the controller 225 of the smartphone 200 starts transfer of image data. With this control, for example, in a case where three smartphones 200a to 200c are connected to the video camera 100 and the last connected smartphone 200c is not permitted to transfer images, when image transfer stops from at least one of the two smartphones 200a and 200b that are permitted to transfer images, it becomes possible for the last connected smartphone 200c to immediately start image transfer.

Figure 10:
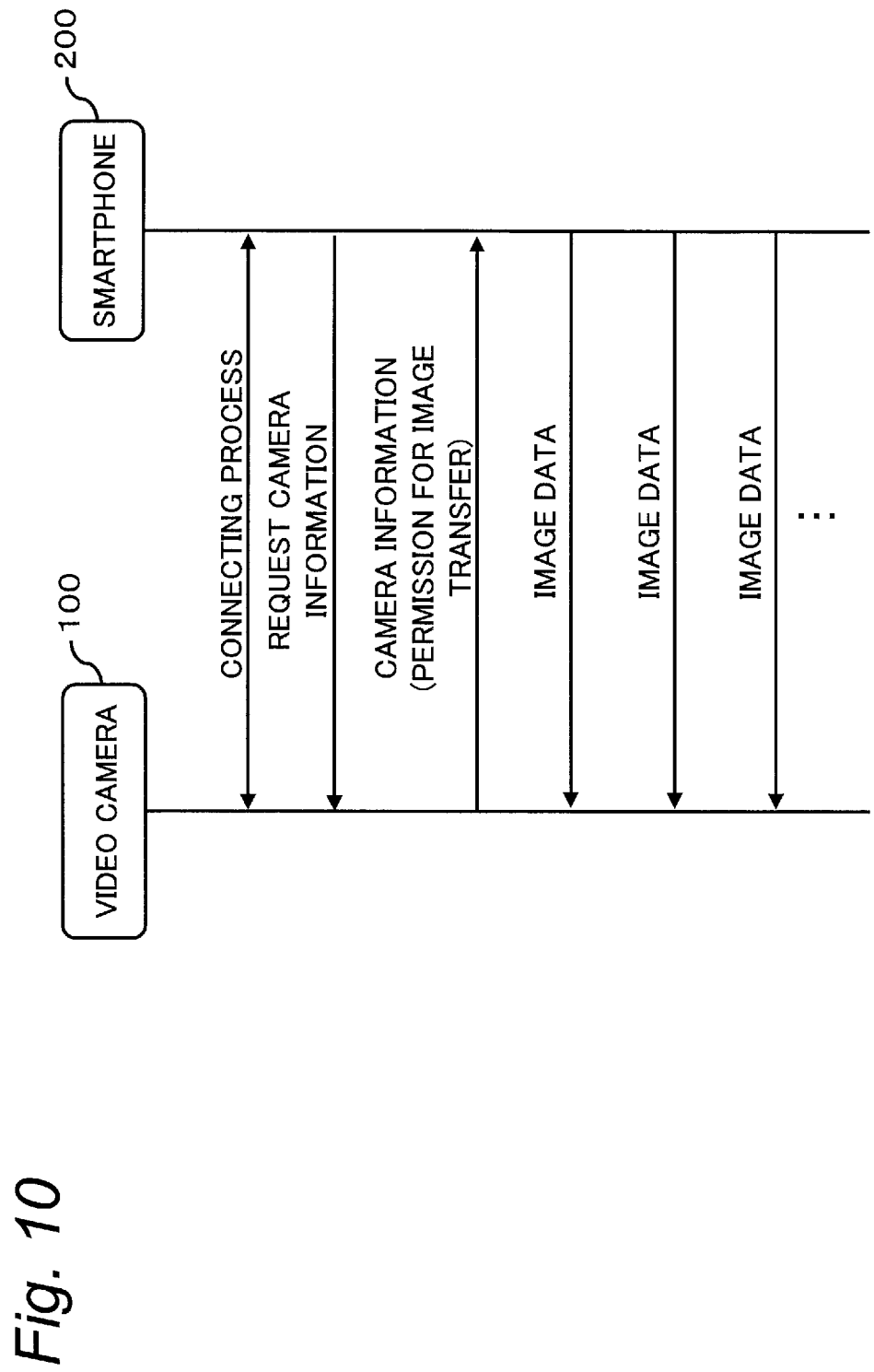
FIG. 10 is a sequence diagram illustrating communication between the video camera and the smartphone when image transfer is permitted.
Figure 11:
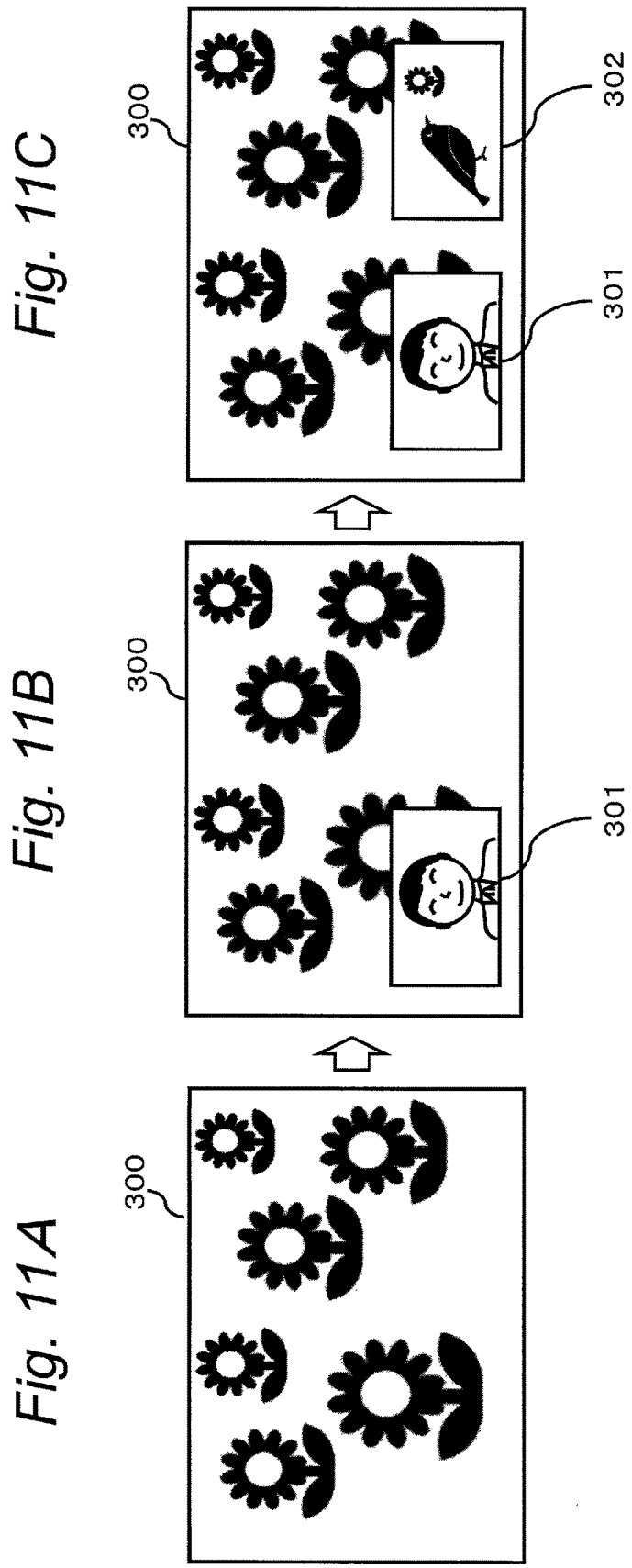
FIGS. 11A to 11C are diagrams illustrating addition of wipe images associated with connection of the smartphone.
Figure 12:
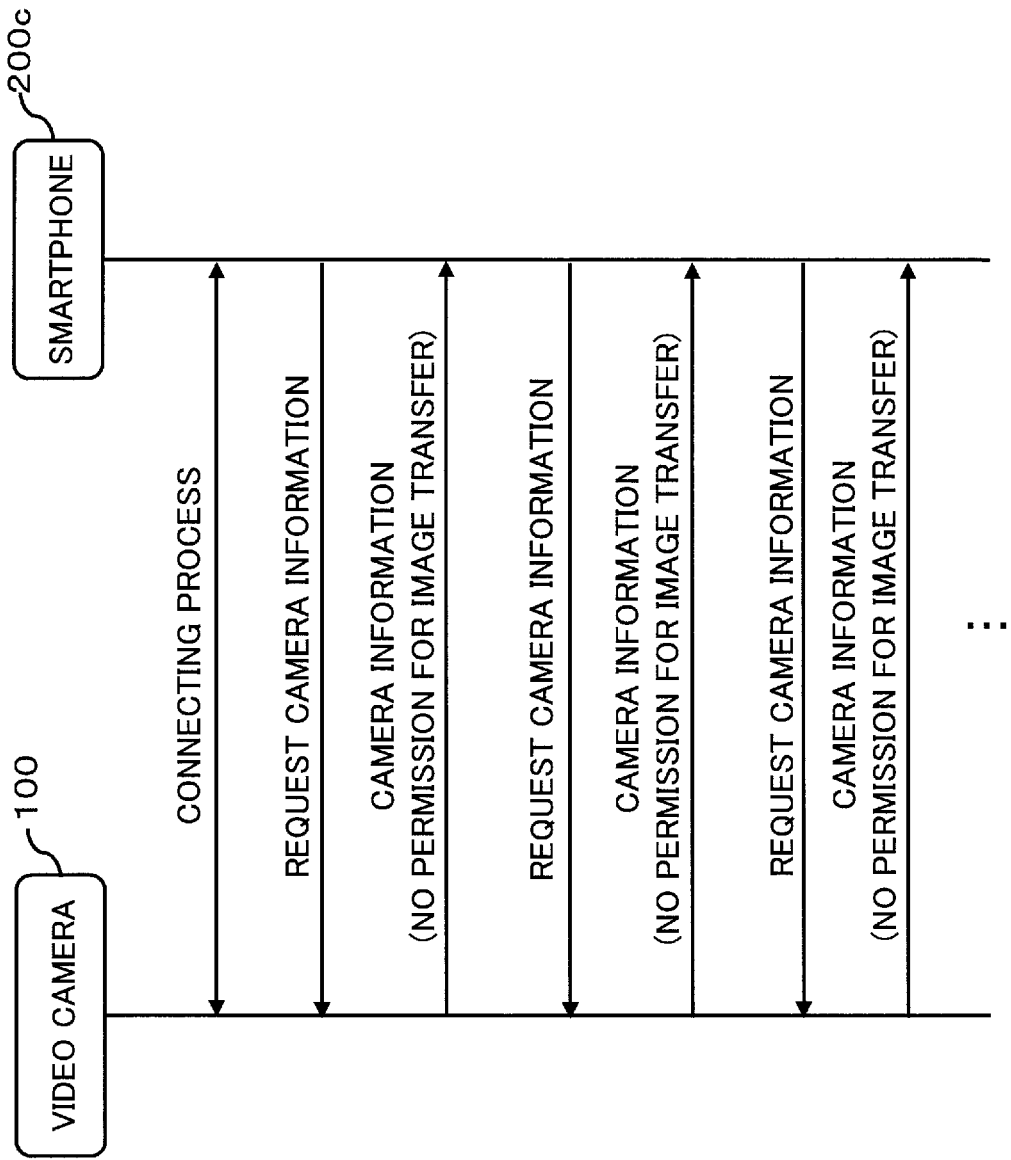
FIG. 12 is a sequence diagram illustrating the communication between the video camera and the smartphone when image transfer is not permitted.

FIG. 10 is a sequence diagram of data communication between the video camera 100 and the smartphone 200 when image transfer is permitted. FIGS. 11A-11C are diagrams illustrating addition of wipe images associated with connection of the smartphone 200. FIG. 12 is a sequence diagram of the data communication between the video camera 100 and the smartphone 200 when image transfer is not permitted.

As illustrated in FIG. 10, when the smartphone 200 is permitted to transfer images, the smartphone 200 sends image data indicating a live video to the video camera 100 after the connecting process between the video camera 100 and the smartphone 200 is completed.

FIG. 11A is a diagram illustrating an image displayed on the LCD monitor 130 of the video camera 100 when the smartphone 200 is not connected to the video camera 100. FIG. 11A illustrates only the main image 300 captured by the video camera 100. Subsequently, when the smartphone 200a is first connected to the video camera 100 as a sub camera, the smartphone 200a sends the image data of the live video to the video camera 100. As a result, as illustrated in FIG. 11B, the wipe image 301 generated by the smartphone 200a is displayed on the main image 300. Subsequently, when the smartphone 200b is further connected to the video camera 100, the smartphone 200b sends the image data of the live video to the video camera 100. As a result, as illustrated in FIG. 11C, the wipe image 302 generated by the smartphone 200b is displayed on the main image 300.

Subsequently, when the smartphone 200c is further connected to the video camera 100, the smartphone 200c is not permitted to transfer images because the number of devices that have already been permitted to transfer images has reached the upper limit. Therefore, a new wipe image is not added to the main image 300, and the screen as illustrated in FIG. 11C is continuously displayed.

FIG. 12 is a diagram illustrating a communication sequence between the smartphone 200c that is not permitted to transfer images and the video camera 100. As illustrated in FIG. 12, the smartphone 200c periodically requests the camera information from the video camera 100 (for example, every one second) without transfer of the image data indicating the live video. As a result, the smartphone 200c periodically determines whether the smartphone 200c is turned to be permitted to transfer images, and when the smartphone 200c is turned to be permitted, the smartphone 200c immediately starts transfer of the image data.

3. Advantageous Effects

As described above, the video camera 100 of the present embodiment (one example of the imaging apparatus) includes the image sensor 115 (one example of the image capturing unit) that captures the subject to generate the image data, the WiFi module 155 (one example of the communicator) that receives the image data (for example, moving image data) from the plurality of smartphones 200 (one example of the electronic devices), and the controller 135 that combines the images indicated by the image data received from the smartphones that are registered in advance as target devices for the multi-wipe function (one example of the predetermined function) with the image indicated by the image data generated by the image sensor 115. The controller 135 registers smartphones, as the target devices for the multi-wipe function (refer to FIG. 7), the number of registered smartphones being equal to or less than a first predetermined number (for example, "3"). The controller 135 limits the number of smartphones from which the image data is received via the WiFi module 155 to a second predetermined number (for example, "2") or less, which is less than the first predetermined number.

The smartphone 200 according to the present embodiment is a device that sends image data to the video camera 100. The smartphone 200 includes the image sensor 203 (one example of the second image capturing unit) that captures the subject to generate the image data, the WiFi module 235 that sends the image data generated by the image sensor 203 to the video camera 100, and the controller 225 (one example of the second controller) that controls sending of the image data to the video camera 100. On receipt of the transfer permission of the image data from the video camera 100, the controller 225 sends the image data generated by the image sensor 203 to the video camera 100.

According to the aforementioned configuration, the video camera 100 limits the number of smartphones that send the image data via the WiFi module 155. This can prevent insufficient bandwidth of a communication line and suppress degradation in image quality during reproduction of the received image resulting from the insufficient bandwidth in the video camera 100.

Other Embodiments

The present disclosure is not limited to the embodiment described above, and various embodiments can be considered. Other embodiments will be described together below.

In the aforementioned embodiment described above, smartphones are used for devices as sub cameras for the multi-wipe function, but other electronic devices may be used. That is, as long as the other electronic devices are capable of communicating with the video camera 100 and capable of sending image data, various electronic devices can be used as sub cameras (for example, a video camera, a digital camera, a cellular phone, a tablet terminal, and a camera-equipped personal computer).

In the aforementioned embodiment, the first predetermined number, which is the upper limit of the number of devices that can be registered as sub cameras, is set to "3", and the second predetermined number, which is the upper limit of the number of external devices (sub cameras) that are permitted to transfer image data to the video camera 100 is set to "2". However, these values are one example. Values of the first and second predetermined numbers can be appropriately set in accordance with applications and constraints of the system.

In the aforementioned embodiment, image data is exchanged between the video camera 100 and the smartphones 200 via communication conforming to the WiFi standard. However, communication conforming to other communication interface standards (for example, Bluetooth (registered trademark)) may be used.

In the aforementioned embodiment, the controller 135 of the video camera 100 and the controller 225 of the smartphone 200 each have a configuration including a CPU or MPU that executes programs. However, these controllers 135 and 225 may each include hardwired electronic circuitry or a microcomputer. That is, the controllers 135 and 225 can each include a device such as a CPU, an MPU, a DSU, an FPGA, an ASIC, or a microcomputer.

In the aforementioned embodiment, image data is transferred from the smartphones to the video camera. However, other types of content data (such as a still picture and sound) may be transferred instead of the image data. In that case, the number of electronic devices that transfer the other types of content data may be limited by a method similar to the method described above.

As described above, the embodiments have been described as illustration of the technology in the present disclosure. For this purpose, the accompanying drawings and detailed description have been provided.

Accordingly, components described in the accompanying drawings and detailed description may include not only components essential for solving problems but also components unessential for solving problems, in order to illustrate the technology. Therefore, it should not be acknowledged immediately that those unessential components be essential because those unessential components are described in the accompanying drawings and detailed description.

Further, since the embodiments described above are intended to illustrate the technology in the present disclosure, various changes, replacements, additions, omissions, etc. may be made within the scope of the appended claims or equivalents thereof.

INDUSTRIAL APPLICABILITY

The present disclosure is useful for an imaging apparatus (for example, video camera) capable of receiving image data from a plurality of external devices and recording an image obtained by combining images indicated by the received image data with an image captured by the imaging apparatus.

The invention claimed is:

1. An imaging apparatus capable of combining and recording a plurality of images, comprising:
an image sensor configured to capture a subject to generate image data;
a communication circuit configured to receive image data from a plurality of electronic devices;
a first processor configured to combine an image indicated by the image data received from an electronic device registered in advance as a target device for a predetermined function with an image indicated by the image data generated by the image sensor; and
a display monitor configured to display an image obtained by superimposing the images indicated by the image data received from the plurality of electronic devices on part of a region of the image indicated by the image data generated by the image sensor,
wherein the first processor
registers the electronic devices as the target device, the number of registered electronic devices being equal to or less than a first predetermined number, and
limits the number of the electronic devices from which the image data is received to a second predetermined number or less, the second predetermined number being less than the first predetermined number.

2. The imaging apparatus according to claim 1, wherein the first processor sets the electronic devices permitted or not permitted to transfer the image data, and
in a case where the number of the electronic devices that have been permitted to transfer the image data is less than the second predetermined number when communication is established between the imaging apparatus and the electronic device, the first processor sends information indicating permission to transfer the image data to the electronic device.

3. An electronic device for sending image data to the imaging apparatus according to claim 2, comprising:
a second image sensor configured to capture a subject to generate the image data;
a second communication circuit configured to send the image data generated by the second image sensor to the imaging apparatus; and
a second processor configured to control sending of the image data to the imaging apparatus,
wherein upon receipt of the permission to transfer the image data from the imaging apparatus, the second processor sends the image data generated by the second image sensor to the imaging apparatus, and
an image indicated by the image data sent from the electronic apparatus is superimposed together with an image indicated by image data sent from another electronic apparatus on part of a region of the image indicated by the image data generated by the imaging apparatus.

4. The electronic device according to claim 3, which is a smartphone.

5. An imaging system comprising:
the electronic device according to claim 3; and
the imaging apparatus capable of combining and recording a plurality of images, wherein,
the image sensor is configured to capture a subject to generate image data;
the communication circuit is configured to receive image data from a plurality of electronic devices;
the first processor is configured to combine an image indicated by the image data received from an electronic device registered in advance as a target device for a predetermined function with an image indicated by the image data generated by the image sensor; and
the display monitor is configured to display an image obtained by superimposing the images indicated by the image data received from the plurality of electronic devices on part of a region of the image indicated by the image data generated by the image sensor,
wherein the processor
registers the electronic devices as the target device, the number of registered electronic devices being equal to or less than a first predetermined number, and
limits the number of the electronic devices from which the image data is received to a second predetermined number or less, the second predetermined number being less than the first predetermined number,
sets the electronic devices permitted/not permitted to transfer the image data, and in a case where the number of the electronic devices that have been permitted to transfer the image data is less than the second predetermined number when communication is established between the imaging apparatus and the electronic device, sends information indicating permission to transfer the image data to the electronic device.

* * * * *